United States Patent
Prindle

(10) Patent No.: US 6,499,428 B1
(45) Date of Patent: Dec. 31, 2002

(54) QUICK DISCONNECT, DISPOSABLE NEEDLE AND HUB ASSEMBLY

(75) Inventor: Gordon Prindle, Bartlett, IL (US)

(73) Assignee: Ideal Instruments, Inc., Schiller Park, IL (US)

(*) Notice: Subject to any disclaimer, the term of this patent is extended or adjusted under 35 U.S.C. 154(b) by 0 days.

(21) Appl. No.: 09/918,985

(22) Filed: Jul. 31, 2001

(51) Int. Cl.[7] ............................................. A01K 45/00
(52) U.S. Cl. ................................................. 119/6.8
(58) Field of Search ............................ 119/6.8; 604/272

(56) References Cited

U.S. PATENT DOCUMENTS

| | | | |
|---|---|---|---|
| 4,981,469 A | * | 1/1991 | Whitehouse et al. ......... 604/86 |
| 5,056,464 A | | 10/1991 | Lewis |
| 5,136,979 A | | 8/1992 | Paul et al. |
| 5,188,620 A | * | 2/1993 | Jepson et al. ................ 604/283 |
| 5,344,414 A | * | 9/1994 | Lopez et al. ................ 604/283 |
| 5,438,954 A | | 8/1995 | Phelps et al. |
| 5,601,536 A | * | 2/1997 | Crawford et al. ........... 604/263 |
| 5,699,821 A | * | 12/1997 | Paradis ........................... 137/1 |
| 5,806,831 A | * | 9/1998 | Paradis ..................... 251/149.1 |
| RE35,973 E | | 12/1998 | Paul et al. |
| 6,032,612 A | | 3/2000 | Williams |
| 6,142,446 A | * | 11/2000 | Leinsing .................. 251/149.1 |

* cited by examiner

Primary Examiner—Charles T. Jordan
Assistant Examiner—Danielle Rosenthal
(74) Attorney, Agent, or Firm—Ian C. McLeod

(57) ABSTRACT

The present invention provides a quick disconnect, disposable needle and hub assembly that can be used in apparatuses used to inject vaccines or other beneficial materials into eggs. In particular, the components of the assembly are manufactured from a polymeric material and the connections between the components in the assembly are by luer lock connections.

18 Claims, 5 Drawing Sheets

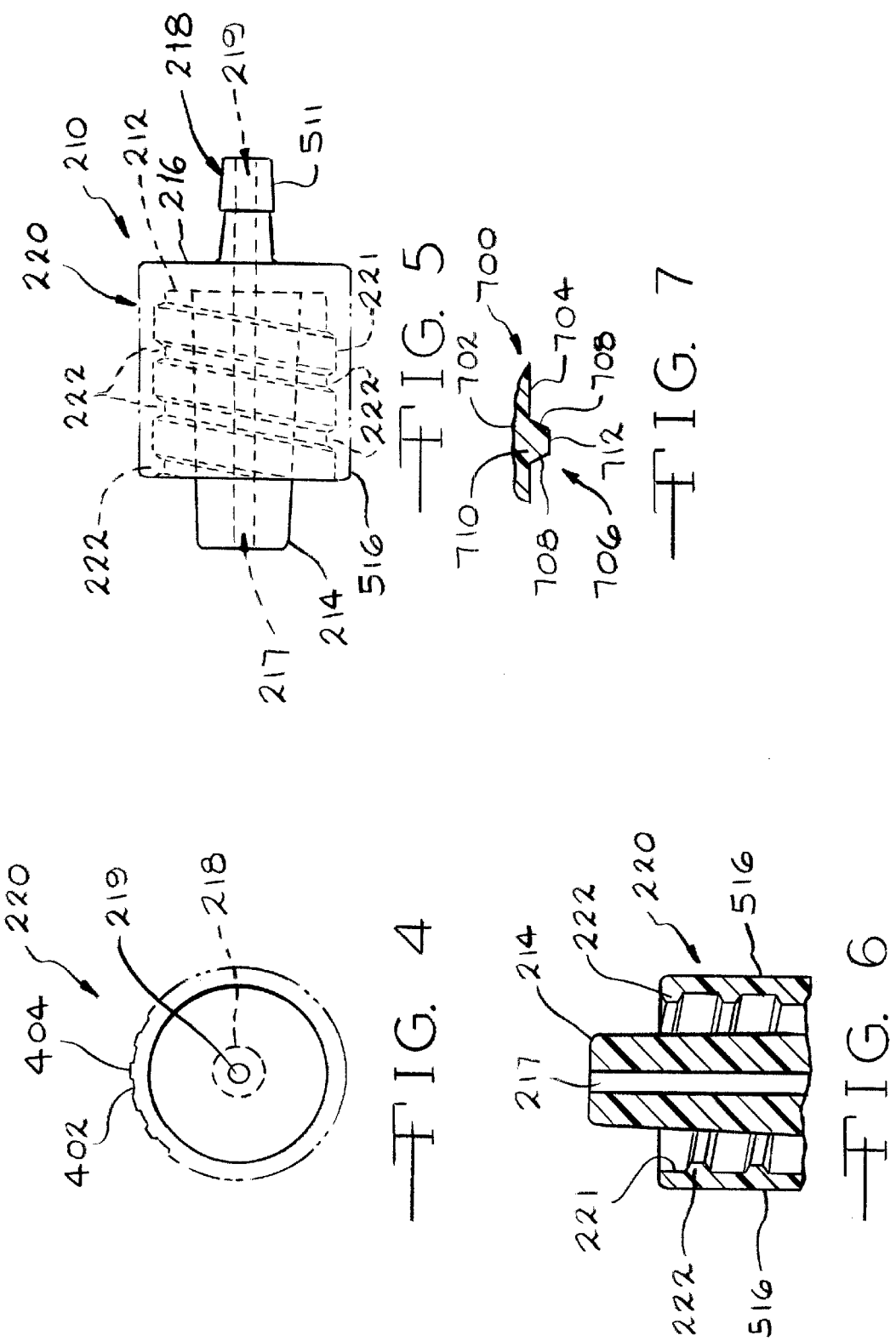

US 6,499,428 B1

QUICK DISCONNECT, DISPOSABLE NEEDLE AND HUB ASSEMBLY

CROSS-REFERENCE TO RELATED APPLICATION

Not Applicable.

STATEMENT REGARDING FEDERALLY SPONSORED RESEARCH OR DEVELOPMENT

Not Applicable.

Reference to a "Computer Listing Appendix Submitted on a Compact Disc"

Not Applicable.

BACKGROUND OF THE INVENTION (1) Field of the Invention

The present invention relates to a quick disconnect, disposable needle and hub assembly that can be used in apparatuses used to inject vaccines or other beneficial materials into eggs. In particular, the components of the assembly are manufactured from a polymeric material and the connections between the components in the assembly are by luer lock connections.

(2) Description of Related Art

Automatic injection systems comprising egg injection apparatuses for inoculating eggs with vaccines or other beneficial materials are known in the art. Examples of egg injecting apparatuses are illustrated in U.S. Pat. No. 5,056,464 to Lewis, U.S. Pat. Re. No. 35,973 and U.S. Pat. No. 5,136,979, both to Paul et al., U.S. Pat. No. 5,438,954 to Phelps et al., and U.S. Pat. No. 6,032,612 to Williams.

Current needle and hub assemblies for use in many egg injecting apparatuses consist of a metal fitting with a cavity that is attached to a second metal fitting with a cavity using standard screw threads. A needle is attached to a hub which has standard screw threads. The hub is screwed to the fitting and the fitting screwed to the second fitting such that the needle cannula extends through the cavities of the fitting and second fitting. The disadvantages of the needle and hub assembly are that they are expensive to manufacture and the screw threads make it difficult to quickly replace damaged needles in the assemblies when mounted in the injecting apparatus. To make tight seals, the hub and both fitting connections must be tightened using tools. Furthermore, the threads can be easily stripped, which renders the fittings unuseable.

Therefore, there is a need for an inexpensive needle and hub assembly that can be used in egg injecting apparatuses. There is a further need for a needle and hub assembly that is easily to assemble in the injection apparatus.

SUMMARY OF THE INVENTION

The present invention provides a quick disconnect, disposable needle and hub assembly comprising (a) an elongate needle cannula having a proximal end, a distal end, and a sidewall therebetween, the cannula having a lumen therethrough; (b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line and wherein the inlet is continuous with the lumen of the needle cannula, and a collar having an array of internal luer lock threads projecting unitarily from the distal end of the hub in spaced concentric relationship about the tip; and (c) a fitting including an elongate body having a proximal end, a distal end, and a sidewall therebetween, the elongate body having a cavity therethrough wherein the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the distal end of the fitting, the elongate body having at its distal end a tip projecting therefrom and a collar having an array of internal luer lock threads projecting unitarily from the distal end of the fitting in spaced concentric relationship to the tip, and the elongate body having an inlet traversing the sidewall connectable to a supply line.

In a preferred embodiment, the quick disconnect, disposable needle and hub assembly further includes a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting.

The present invention further provides a quick disconnect, disposable needle and hub assembly mounted in an injection apparatus for injecting a material into an egg comprising (a) an elongate needle cannula having a proximal end, a distal end, and a sidewall therebetween, the cannula having a lumen therethrough; (b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line for the material and wherein the inlet is continuous with the lumen of the needle cannula, and a collar having an array of internal luer lock threads projecting unitarily from the distal end of the hub in spaced concentric relationship about the tip; and (c) a fitting including an elongate body having a proximal end, a distal end, and a sidewall therebetween, the elongate body having a cavity therethrough wherein the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the distal end of the fitting, the elongate body having at its distal end a tip projecting therefrom and a collar having an array of internal luer lock threads projecting unitarily from the distal end of the fitting in spaced concentric relationship to the tip, and the elongate body having an inlet traversing the sidewall connectable to a supply line for introducing a means for sterilizing the needle cannula; and (d) a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting, wherein the second fitting is mounted in the apparatus and the needle cannula is moved with the second fitting to inject the material into the egg.

Further still, the present invention provides in an injection apparatus for injecting a material in an egg, wherein the injection apparatus includes an injection needle mounted in the apparatus for injecting the material into the egg, the improvement is that the injection needle mounted in the apparatus is a quick-disconnect disposable needle and hub assembly comprising (a) an elongate needle cannula having a proximal end, a distal end, and a sidewall therebetween, the needle cannula having a lumen therethrough; (b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line for the material and wherein the inlet is continuous with the lumen of the needle cannula, and a collar having an array of internal luer lock threads projecting unitarily from the distal end of the hub in spaced concentric relationship about the tip; (c) a fitting including an elongate body having a proximal end, a distal end, and a sidewall therebetween, the elongate body having a cavity therethrough wherein the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the distal end of the fitting, the elongate body having at its distal end a tip projecting therefrom and a collar having an array of internal luer lock threads projecting unitarily from the distal end of the fitting in spaced concentric relationship to the tip, and the elongate body having an inlet traversing the sidewall connectable to a supply line for introducing a means for sterilizing the needle cannula; and (d) a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting, wherein the second fitting is mounted in the apparatus and the needle cannula is moved with the second fitting to inject the material into the egg.

Further still, the present invention provides a package containing a quick disconnect, disposable needle and hub assembly comprising (a) an elongate needle cannula having a proximal end, a distal end, and a sidewall therebetween, the needle cannula having a lumen therethrough; (b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line and wherein the inlet is continuous with the lumen of the needle cannula, and a collar having an array of internal luer lock threads projecting unitarily from the distal end of the hub in spaced concentric relationship about the tip; and (c) a fitting including an elongate body having a proximal end, a distal end, and a sidewall therebetween, the elongate body having a cavity therethrough wherein the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the distal end of the fitting, the elongate body having at its distal end a tip projecting therefrom and a collar having an array of internal luer lock threads projecting unitarily from the distal end of the fitting in spaced concentric relationship to the tip, and the elongate body having an inlet traversing the sidewall connectable to a supply line.

In a preferred embodiment, the package includes a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting.

In the above embodiments of the present invention, it is preferable that the hub and fitting comprise a material that is a polymer, in particular, a material that is transparent. It is further preferable that the needle is cylindrical.

OBJECTS

Therefore, it is an object of the present invention to provide a quick disconnect, disposable needle and hub assembly that can be used in the injectors that comprise the apparatuses used for injecting eggs with vaccines or other beneficial materials.

These and other objects of the present invention will become increasingly apparent with reference to the following drawings and preferred embodiments.

DESCRIPTION OF THE DRAWINGS

FIG. 4 is an end view of the proximal end of the hub of the disposable needle and hub assembly of the present invention.

FIG. 5 is a side view of the hub of the disposable needle and hub assembly of the present invention.

FIG. 6 is a cross-sectional view of the collar of the hub shown in FIG. 5.

FIG. 7 is a cross sectional view of a thread in the disposable needle and hub assembly of the present invention.

DETAILED DESCRIPTION OF THE INVENTION

Figure 1:
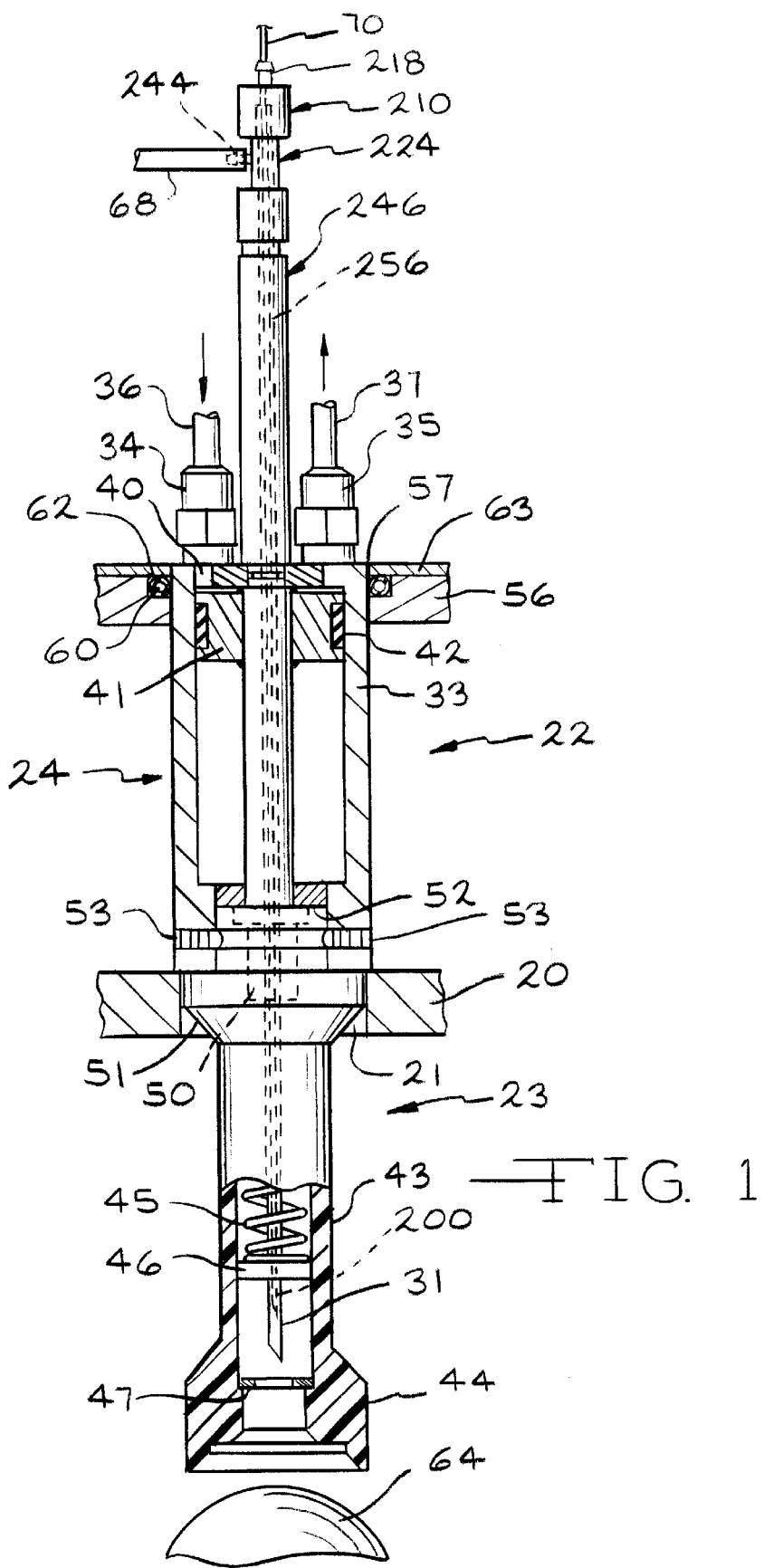
FIG. 1 is a cross-sectional view of an injector containing the disposable needle and hub assembly of the present invention.

All patents, patent applications, government publications, government regulations, and literature references cited in this specification are hereby incorporated herein by reference in their entirety. In case of conflict, the present description, including definitions, will control.

The present invention is illustrated in overall fashion in FIGS. 2–8. These figures illustrate various aspects of the quick disconnect, disposable needle and hub assembly of the present invention.

In general, the quick disconnect, disposable needle and hub assembly of the present invention comprises a hub with a tapered tip at one end and an inlet at the other end. A needle cannula with a lumen securely fixed to a tapered tip such that the needle projects away from the hub. The inlet has an opening that is continuous with the needle lumen.

The hub further has a collar projecting from the end with the tip with internal luer lock threads therein, which enables the hub to be attached to external or male luer lock threads at one end of a fitting with a cavity therethrough, the cavity which defines a female luer lock taper to receive the tapered tip of the hub. When the luer lock threads are engaged, the tapered tip forms a seal with the sidewall of the fitting and the needle cannula extends through the cavity of the fitting and projecting away from the fitting. The luer lock threads allows quick assembly and disassembly of the hub and fitting. The fitting further includes an inlet with an opening that is continuous with the cavity, which is connectable to a supply line.

At the other end of the fitting is a tapered tip and a collar with internal luer lock threads projecting away from the end. The tip includes an opening that is continuous with the cavity of the fitting. The luer lock threads enable the fitting to be attached to one end of a second fitting with external male luer lock threads and a cavity therethrough, the cavity which defines a space with a diameter sufficient to form a female luer lock taper. When the luer lock threads are engaged, the tapered tip forms a seal with the sidewall of the second fitting and the needle cannula extends through the cavity of the second fitting and projecting away from the second fitting. The luer lock threads allows quick assembly and disassembly of the fitting and second fitting. The ends of the second fitting are open.

When fully assembled, the fitting and second fitting form a continuous cavity in which the needle cannula extends therethrough. The inlet in the fitting allows sterilizing or cleaning solutions or gases to be introduced into the cavity, which sterilizes or cleans the outer surface of the needle. The opening at the end of the second fitting allows the solutions or gases to be removed. The present invention is useful for use in automatic egg injection systems, particularly apparatuses that use injectors to inoculate eggs with vaccines or other beneficial materials. Examples of such apparatuses and injectors are illustrated in U.S. Pat. No. 5,056,464 to Lewis, U.S. Pat. Re. No. 35,973 and U.S. Pat. No. 5,136,979, both to Paul et al., U.S. Pat. No. 5,438,954 to Phelps et al., and U.S. Pat. No. 6,032,612 to Williams.

The quick disconnect, disposable needle and hub assembly of the present invention is an improvement over the needle and hub assemblies of the prior art. The hub and fitting are made from inexpensive polymers instead of more expensive metals. Most important, the hub and fittings are connected by luer locks, which allows needles and fittings to be replaced quickly, and because luer locks can form tight seals when made finger tight, hubs and fittings can be easily replaced without the use of tools and while the injector is mounted in the egg injecting apparatus. Furthermore, by making the hub and fittings out of polymers, tight seals can be made without the need for gaskets.

The present invention mounted in an injector for an egg injecting apparatus is illustrated in FIG. 1. The injector is described in detail in U.S. Pat. Re. No. 35,973 and U.S. Pat. No. 5,136,979, both to Paul et al. The general structure and operation of the injector is provided below.

The egg injecting apparatus comprises a plurality of injectors (not shown). Each injector 22 rests generally vertically in an opening 21 in a tooling plate 20 of the injecting apparatus. A lower portion broadly designated at 23 of the injector 22 depends downwardly below the tooling plate 20 and an upper portion broadly designated at 24 rests at or above the tooling plate 20. Mounted within the injector 22 is the quick disconnect, disposable needle and hub assembly of the present invention broadly consisting of hub 210, fitting 224, and second fitting 256. The quick disconnect, disposable needle and hub assembly is shown in greater detail in FIGS. 2–10.

The injector 22 comprises a fluid-driven cylinder 33, which in preferred embodiments is a double-shafted, double-acting air driven cylinder that drives a punch 31 and a needle 200 in reciprocal opposite directions between respective retracted and injecting positions. The cylinder 33 comprises a pair of air entry fittings 34 and 35, which are connected to air supply lines 36 and 37, respectively. To drive the punch 31 and the needle 200 downwardly, air is directed into the air line 36 through the air entry fitting 34 through opening 40 in the cylinder 33. The incoming air drives the piston 41, which preferably has an annular seal 42 for bearing against the inner diameter of the cylinder 33. At the bottom of the piston stroke, and to desirably return the punch 31 to a retracted position, air is directed in through the air line 37 and the air entry fitting 35 and travels through housing of the cylinder 33 into the lower portion thereof so as to drive the piston 41 back upwardly. The path of the air entering through the air entry fitting 35 is not shown, however, it comprises an opening analogous to opening 40, and an associated path to the lower portion of the cylinder 33.

While a double-acting cylinder is shown, the quick disconnect, disposable needle and hub assembly of the present invention can be used with injection apparatuses of other configurations.

The lower portion 23 of the injector 22 comprises a cylindrical punch guide 43 which surrounds the punch 31 and the needle 200. Bottom portions of the punch guide 43, shown as the slightly larger diameter portion 44, extend below the needle 200 and the punch 31 when the needle 200 and the punch 31 are in a retracted position. When the needle 200 and the punch 31 are in the injecting position (not shown), the needle 200 extends below the bottom portion 44 of the punch guide 43, while the punch 31 extends to a lower position within the punch guide 43. In a preferred embodiment, the lowermost portion 44 of the punch guide 43 forms an egg receiving cup.

The lower portion 23 of the injector, particularly the punch guide 43, is circular in cross-section. The opening 21 in the tooling plate 20 is also circular and has a diameter somewhat larger than the diameter of the circular cross-section of the lower portion 23. The respective difference in size between the opening 21 and the injector 22 permits the lower portion 23 of the injector 22 to move in translational fashion within the opening 21 in the tooling plate 20.

The injector 22 further includes a biases spring 45 that acts as a flexible spacer that ensures that the punch 31 penetrates an egg 64 before the needle 200 penetrates it. The spring is strong enough to permit the punch 31 to puncture the egg 64 but flexible enough to be driven by the air cylinder 33. The spring 45 is complemented by a head portion 46 and a punch stop ring 47. At its upper portion, the spring 45 carries spring stop 50. In addition to providing some additional mass, the spring stop 50 serves as the upper head of the spring 45 and a partial support for the turns of the spring 45.

The punch guide 43, which is preferably of a polymeric material, includes a smaller diameter main portion, a larger diameter lower portion 44, and a larger diameter upper portion 51. The upper portion 51 rests in opening 21 of the tooling plate 20. In the particular embodiment shown, a further cylindrical top portion of the punch guide 52 extends upwardly into the upper portion 24 of the injector 22 and is secured in place by one or more set screws 53, or other conventional means.

The injector further comprises a stabilizer plate 56, which is positioned above the tooling plate 20 and has one or more openings 57 therethrough. The upper portion 24 of the injector 22 extends through opening 57 but the injector 22 is not otherwise attached to the stabilizer plate 56. As a result, when the injector 22 disengages from the tooling plate 20, the upper portion 24 remains oriented by the stabilizer plate 56 but is still permitted translational motion. In preferred embodiments, the tooling plate 20 and the stabilizer plate 56 are in fixed relationship to one another so that the raising and lowering means raise the stabilizing plate 56 along with the tooling plate 20. As shown and preferred, the openings 57 and the stabilizer plate 56 are in substantial registration with the openings 21 in the tooling plate 20. While shown are two separate plates 20 and 56, a single plate or block of appropriate dimensions could perform the equivalent functions.

In preferred embodiments, the opening 57 in the stabilizer plate 56 is larger than the upper portion 24 of the injector 22 that extends therethrough. In this embodiment, the stabilizer plate 56 further comprises releasable means for securing the upper portion of the injector 22 to the stabilizer plate 56 while the injector 22 is injecting the egg 64, and then releasing the injector 22 so that the vertical and translational movement of the injector 22 is more independent of the stabilizer plate 56. As shown in FIG. 1, the releasable securing means are shown as an inflatable fluid bladder portion 60 that is adjacent to the perimeter of the opening 57 in the stabilizer plate 56. The bladder 60 is inflatable to a size sufficient to contact and secure the upper portion 24 of the injector 22. When the bladder 60 is deflated, the injector 22 is free to move without interference from the bladder 60. The bladder 60 can be formed of any appropriately expandable tubing.

As shown in FIG. 1, the bladder 60 is positioned in the small perimeter opening 62 that is adjacent to the opening 57 in the stabilizer plate 56. The bladder 60 is held in place by the top plate 63. However, the bladder 60 can be positioned in any one of a number of other ways which are not shown but which are equivalent to that shown herein. Furthermore, a single air pressure source with appropriate controls can be used to drive the fluid driven cylinder 33 as well as the bladder 60.

Inlet 244 allows sterilizing fluid to be added to the cavity 256. The sterilizing fluid entering through the inlet 244 from tubing 68 travels through the cavity 256 to clean the interior of the punch 31 and the exterior of the needle 200. The punch 31 further includes exit openings (not shown) adjacent to and partially above the lowermost portions of the punch 31. The exit openings permit sterilizing fluid to travel from the inlet 244 through the cavity 256 and then to the exterior surface of the punch 31 so that the sterilizing fluid sterilizes the cavity 256, the needle 200, and both the interior and exterior portions of the punch 31 that are most likely to enter an egg during injection.

Vaccine or other beneficial material is provided to the needle through inlet 218 from tubing 70. The vaccine or other beneficial material is provided to the egg 64 when the needle is in the extended position.

A more detailed description of the quick disconnect, disposable needle and hub assembly of the present invention is provided in FIGS. 2–10 and described below.

Figure 2:
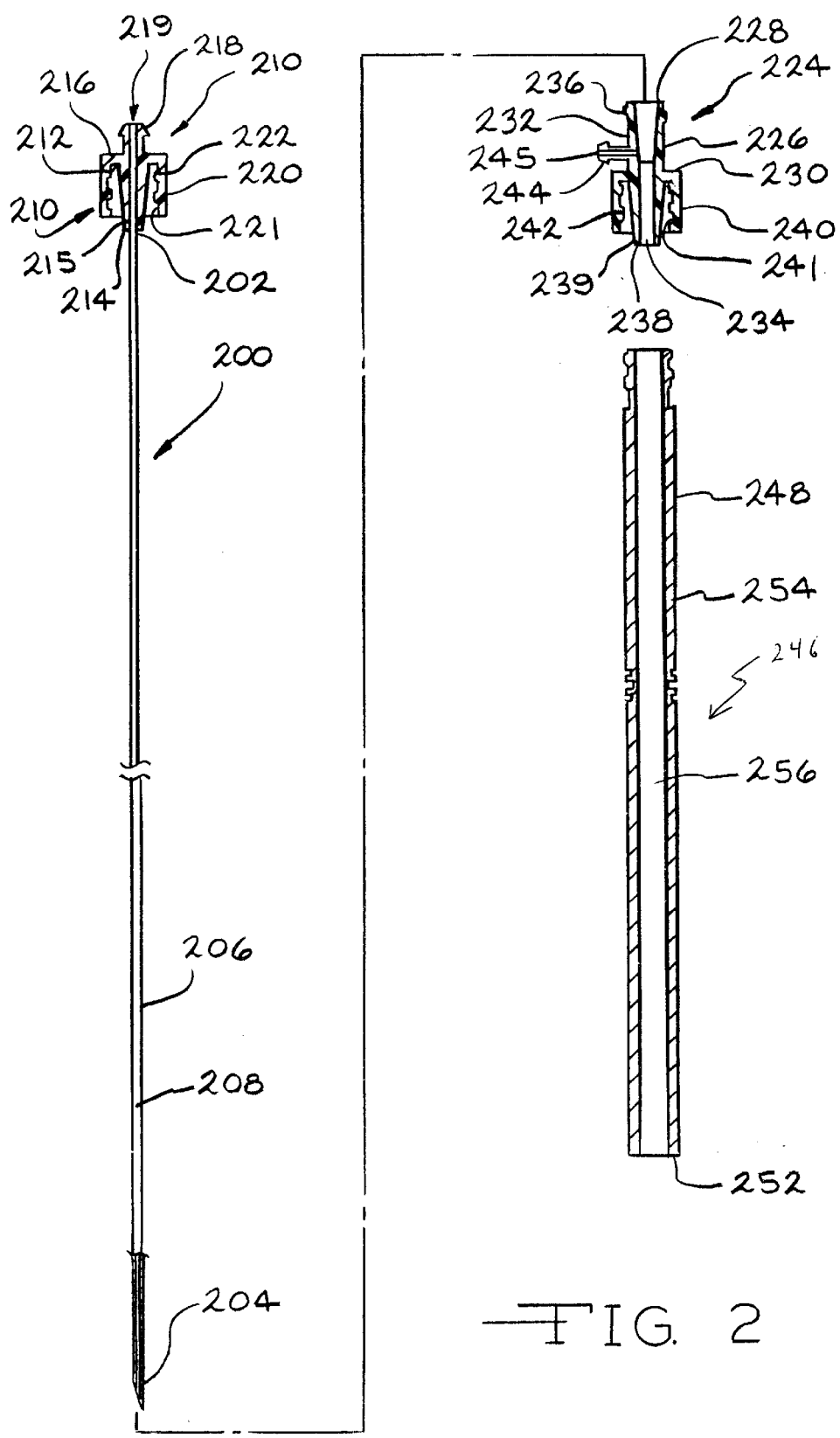
FIG. 2 is a disassembled view of the disposable needle and hub assembly of the present invention.

A disassembled view of the quick disconnect, disposable needle and hub assembly of the present invention is shown in FIG. 2. The assembly comprises an elongate needle cannula 200 having a proximal end 202, a distal end 204, and a sidewall 206 therebetween, the needle cannula 200 having a lumen 208 therethrough. Preferably, the needle cannula 200 is beveled at its distal end 204.

A hub 210 is securely fixed to the proximal end 202 of the needle cannula 200. The hub 210 includes a distal end 212 with a tip 214 projecting therefrom for fixing the proximal end 202 of the needle cannula 200 so that the needle cannula 200 extends away from the distal end 212 of the hub 210, a proximal end 216 having an inlet 218 projecting therefrom, which is connectable to a supply line (not shown) and wherein the inlet 218 has an opening 219 that is continuous with the lumen 208 of the needle cannula 200, and a collar 220 with an inner surface 221 having an array of internal luer lock threads 222 projecting unitarily from the distal end 212 of the hub 210 in spaced concentric relationship about the tip 214. The tip 214, which has opening 217 and sidewall 215, is tapered as it extends away from the distal end 212 of the hub 210. When the needle cannular 200 is fixed to tip 214, opening 217 is continuous with the lumen 208 of needle cannula 200.

The needle and hub assembly further includes a fitting 224 comprising an elongate body 226 having a proximal end 228, a distal end 230, and a sidewall 232 therebetween. The elongate body 226 has a cavity 234 therethrough defining a space at the proximal end 228 with a diameter sufficient to receive the tip 214 of the hub 210. The elongate body 226 at its proximal end 228 has external luer lock threads 236, which engage the internal luer lock threads 222 of the collar 220 of the hub 210. When the luer lock threads are enagaged, a seal is formed between the sidewall 232 of the fitting 224 and the sidewall 215 of the tip 214 of the hub 210 so that the distal end 204 of the needle cannula 200 extends through the cavity 234 of the elongate body 226 parallel to the sidewall 232 and extends away from the distal end 230 of the fitting 224.

The elongate body 226 has at its distal end 230 a tip 238 with an opening 237 and a sidewall 239 projecting therefrom and a collar 240 having on its inner surface 241 an array of internal luer lock threads 242 projecting unitarily from the distal end 230 of the fitting 224 in spaced concentric relationship to the tip 238. The tip 238 is tapered as it extends away from the distal end 230 of the elongate body 226. The elongate body 226 further has an inlet 244 traversing the sidewall 232 connectable to a supply line (not shown) wherein the opening 245 in the inlet 244 is continuous with the cavity 234.

In particular embodiments of the quick disconnect, disposable needle and hub assembly of the present invention, in particular embodiments that are to be used in the injector shown in FIG. 1, the quick disconnect, disposable needle and hub assembly further includes a second fitting. As shown in FIG. 2, The second fitting 246 has an elongate body 248 having a proximal end 250, a distal end 252, and a sidewall 254 therebetween. The elongate body 248 has a cavity 256 therethrough defining a space with a diameter sufficient to receive the tip 238 of the fitting 224. The elongate body 248 of the second fitting 246 at its proximal end 250 has external luer lock threads 258, which engage the internal luer lock threads 242 of the collar 240 of the fitting 224. When the luer lock threads are engaged, a seal is formed between the sidewall 254 of the second fitting 246 and the sidewall 239 of the tip 238 of the fitting 224. When assembled, the cavity 256 of second fitting 246 is continuous with the cavity 234 of fitting 224, and the distal end 204 of the needle cannula 200 extends through the cavity 256 of the elongate body 248 of the second fitting 246 parallel to the sidewall 254 and extends away from the distal end 252 of the second fitting 246.

The hub and fitting can be made from any material, however, it is preferred that the hub and fitting be made of a polymeric material, including but not limited to, polycarbonate, polyethylene, and polypropylene. The second fitting can be made from any material, however, it is preferable that the second fitting be made of a metal, including but not limited to stainless steel and aluminum. The needle is made from a metal, preferably a surgical grade stainless steel.

Figure 3:
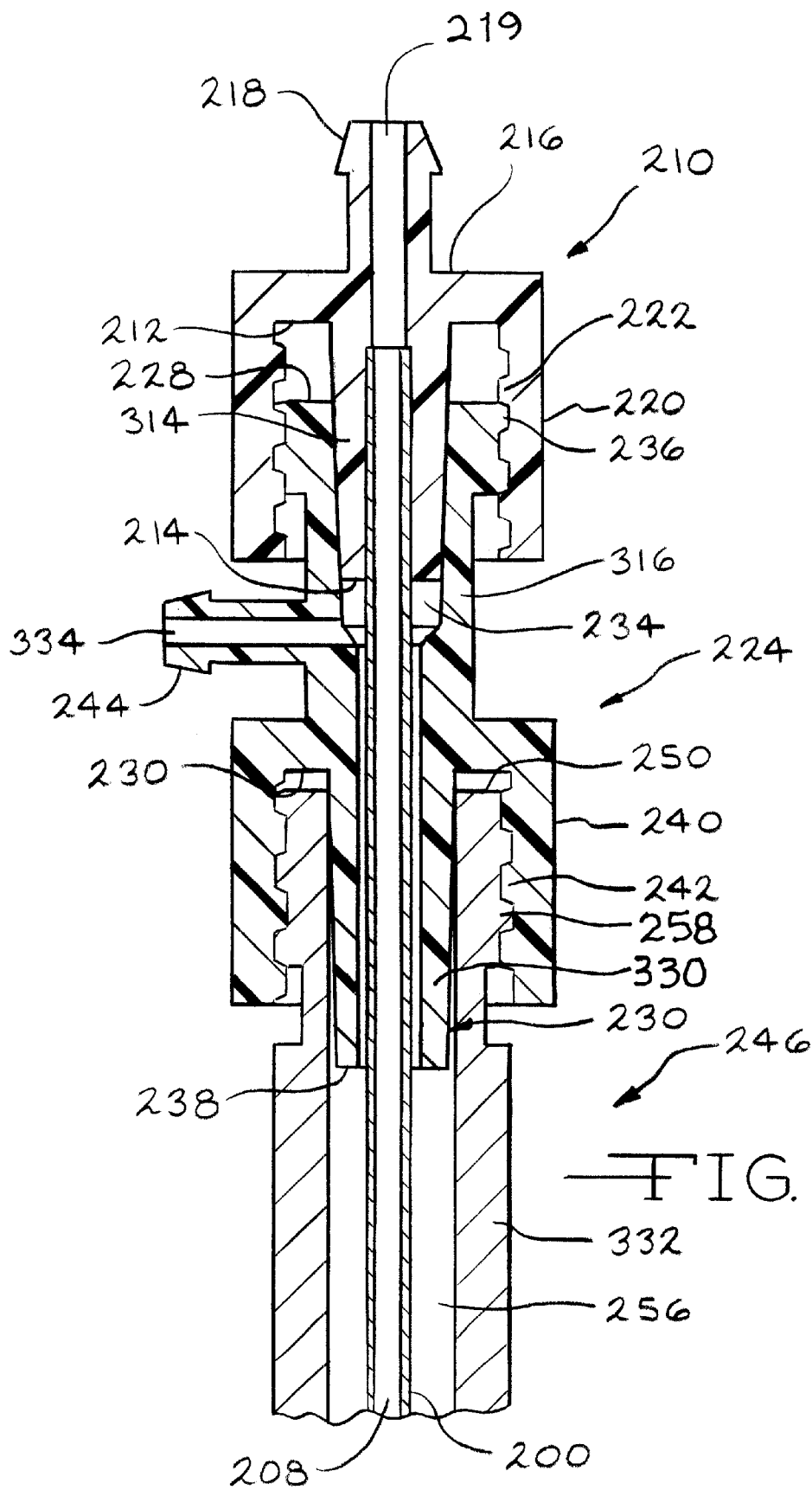
FIG. 3 is a cross-sectional view of an assembled disposable needle and hub assembly of the present invention.

A cross-sectional view of the needle and hub assembly in assembled form is shown in FIG. 3. The internal luer lock threads 222 on the collar 220 at the distal end 212 of the hub 210 engage the external luer lock threads 236 at the proximal end 228 of the fitting 224. The tip 214 of the hub 210 extends into the cavity 234 of the fitting 224 such that the tapered sidewall 314 of the tip 214 forms a seal with the sidewall 316 of the fitting 224.

The internal luer lock threads 242 on the collar 240 at the distal end 230 of the fitting 224 engage the external luer lock threads 258 at the proximal end 250 of the second fitting 246. The tip 238 of the fitting 224 extends into the cavity 256 of the second fitting 246 such that the tapered sidewall 330 of the tip 238 forms a seal with the sidewall 332 of the second fitting 246.

In the assembled needle and hub assembly, the cavity 234 of the fitting 224, which is continuous with the opening 334 of the inlet 244, is continuous with the cavity 256 of the second fitting 246. Further, the needle cannula 200, which is securely fixed to the tip 214 of the hub 210, extends through the cavity 234 of the fitting 224 and the cavity 256 of the second fitting 246 parallel to the sidewall 316 of the fitting 224 and the sidewall 332 of the second fitting 246.

As shown in FIG. 3, the lumen 208 of the needle cannula 200 is continuous with the opening 219 of the inlet 218 at the proximal end 216 of the hub 210.

When the proximal end of the hub of FIG. 5 is viewed on end, the following features are visible and are shown in FIG. 4. Shown is outer collar 220, which has disposed on its outer surface 402, evenly spaced ribs 404. Also, shown is the proximal end of inlet 218 and its opening 219. In a preferred embodiment, the collar has twenty evenly spaced ribs, each rib 0.73 mm (0.29 in) wide and raised from 0.10 mm (0.004 in) from the surface of the collar. The diameter of the collar measured from the ribs is about 9.36 mm (0.369 in).

A side view of the hub of the quick disconnect, disposable needle and hub assembly of the present invention is shown in FIG. 5. The hub 210 has at its distal end 212, a tip 214 with opening 217 extending therethrough and at its proximal end 216 inlet 218, which is connectable to a supply line (not shown). When the assembled needle and hub assembly is mounted in an injector for an injecting apparatus such as that shown in FIG. 1, the vaccine or other beneficial material is provided to the needle cannula (not shown) via a supply line (not shown). The inlet 218 has a cap 511 and opening 219 extending therethrough, which is continuous with opening 217 of the tip 214. Preferably, the tip 214 is tapered from the proximal end 216 to the distal end 212. The hub 210 further includes collar 220 with an outer surface 516 and inner surface 221. Disposed on the inner surface 221 is an array of luer lock threads 222 projecting unitarily from the distal end 212 of the hub 210 and in spaced concentric relationship about the tip 214. Preferably, the luer lock threads are double start and have a right-hand thread with a 2.5 mm pitch.

In a preferred embodiment of the hub, the hub has the following dimensions. The length of the collar 220 measured from the proximal end 216 of the hub 210 is about 9.52 mm (0.375 in) and the diameter of the collar 220 measured from the internal luer lock threads 222 is about 7.11 mm (0.280 in). The diameter of the collar 220 measured from the inner surface 221 is about 7.98 mm (0.314 in). The length of the tip 214 measured from the proximal end of the hub 216 is about 12.64 mm (0.498 in) in length, which makes the tip 214 extend beyond the collar 220 by about 3.12 mm (0.123 in) The tip is tapered, therefore, as the tip 214 extends away from the proximal end 216 of the hub 210, its diameter decreases from about 4.52 mm (0.178 in) to about 3.99 mm (0.157 in). The inlet 218 has a length of about 4.76 mm (0.188 in) of which the cap 511 comprises about 2.38 mm (0.94 in). The cap 511 is tapered, with a diameter that decreases from about 2.37 mm (0.94 in) to about 2.05 mm (0.81 in). The opening 219 of the inlet 218 has a diameter of about 0.91 mm (0.036 in). The cap 511 provides a means for attaching flexible tubing to the inlet 218.

A cross-sectional view of the distal end of the hub of the needle and hub assembly is shown in FIG. 6. The hub 210 has tip 214 and collar 220 having an outer surface 516 and an inner surface 221. Disposed on the inner surface 221 of the collar 220 are luer lock threads 222, which are preferably a double start, right-handed thread with a 2.5 mm pitch. Extending through the tip 214 is opening 217.

A cross-sectional view of an internal luer lock thread is shown in FIG. 7. The figure shows the outer surface 702 and the inner surface 704 of a section 5 of hub collar 700. Disposed on the inner surface 704 is a luer lock thread 706. Preferably, the base 710 of the thread 706 is about 0.97 mm (0.038 in) and the surface 712 of the thread 706 is about 0.54 mm (0.021 in). The sidewalls 708 of the thread 706 have a pitch of about 26.000°.

Figure 8:
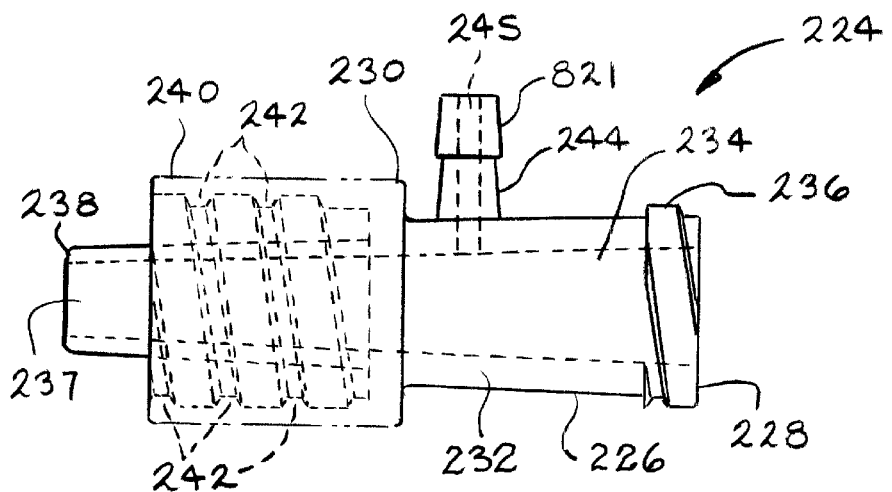
FIG. 8 is a side view of the fitting of the disposable needle and hub assembly of the present invention.

An important part of the quick disconnect, disposable needle and hub assembly of the present invention is the fitting, which is shown in FIG. 8. The fitting 224 comprises elongate body 226 having proximal end 228, distal end 230, and sidewall 232 therebetween. Extending through the elongate body 226 is cavity 234. In a preferred embodiment, the diameter of the cavity narrows from the proximal end 228 to the distal end 230 to form a female luer lock taper. At the proximal end 228 of the elongate body 226 is an external luer lock thread 236 (also referred to as a male luer lock thread). When assembled with the needle and hub (See FIG. 3), the external luer lock thread 236 engages the internal luer lock threads of the collar of the hub (See FIG. 3) to form a seal between the sidewall 232 of the fitting 224 and the tip at the distal end of the hub (See FIG. 3). In the assembled configuration, the distal end of the needle cannula extends from the distal end of the hub through the cavity 234 of the fitting 224 and is about parallel to the sidewall 232 of the fitting 224.

The fitting 224 further includes at its distal end, a tip 238 extending therefrom with opening 237 continuous with the cavity 234, and a collar 240 having an array of internal luer lock threads 242 in spaced concentric relationship to the tip 238. In a preferred embodiment, the tip 238 is tapered as it extends away from the elongate body 226. When the fitting 224 is assembled with a second fitting (See FIG. 3), the internal luer lock threads 242 engage the external luer lock threads of the second fitting to form a seal between the sidewall of the second fitting and the tip 238 of the fitting 224.

The fitting 224 further includes an inlet 244 with cap 821 and opening 245, which is continuous with the cavity 234. The inlet is connectable to a supply line (not shown), which provides a means for washing or sterilizing the needle in the assembled needle and hub assembly when mounted in an injector (see FIG. 1).

In a preferred embodiment, the fitting has the following dimensions. The elongate body 226 has a diameter of about 6.34 mm (0.250 in). The external luer lock thread 236 at the proximal end 228 has an outer diameter of about 7.56 mm (0.298 in) and a pitch to match the luer lock threads of the hub. The collar 240 extends about 9.52 mm (0.375 in) from the distal end 230 of the elongate body 226. The tip 238 extends about 12.64 mm (0.498 in) from the distal end 230 and extends about 3.12 mm (0.123 in) beyond the collar 240. The diameter of the opening 237 of the tip 238 is about 1.98 mm (0.078 in). The tip is tapered, therefore, as the tip 238 extends away from the distal end 230 of the elongate body 226, its diameter decreases from about 4.52 mm (0.178 in) to about 3.99 mm (0.157 in). The inlet 244 has a length of about 4.70 mm (0.185 in) of which the cap 821 comprises about 2.38 mm (0.94 in). The cap 821 is tapered, with a diameter that decreases from about 2.37 mm (0.94 in) to about 2.05 mm (0.81 in). The cap 821 provides a means for attaching flexible tubing to the inlet 244. The distance of the inlet 244 measured from the center of the opening 245 of the inlet 244 to the proximal end 228 of the elongate body 226 is about 8.73 mm (0.344 in). The opening 245 has a diameter of about 0.91 mm (0.036 in). The overall length of the fitting 226 from the proximal end 228 to the most distal end of the tip 238 is about 23.77 mm (0.936 in).

Figure 9:
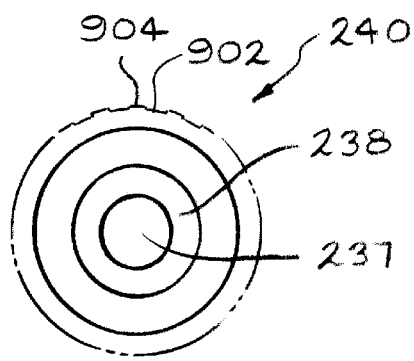
FIG. 9 is a distal end view taken of the fitting in FIG. 8.

When the distal end of the fitting of FIG. 8 is viewed at its distal end, the following features are visible and are shown in FIG. 9. Shown is outer collar 240, which has disposed on its outer surface 902, evenly spaced ribs 904. Also, shown is the distal end of tip 238 and its opening 237. In a preferred embodiment, the collar has twenty evenly spaced ribs, each rib 0.73 mm (0.29 in) wide and raised from 0.10 mm (0.004 in) from the surface of the collar. The diameter of the collar measured from the ribs is about 9.36 mm (0.369 in).

Figure 10:
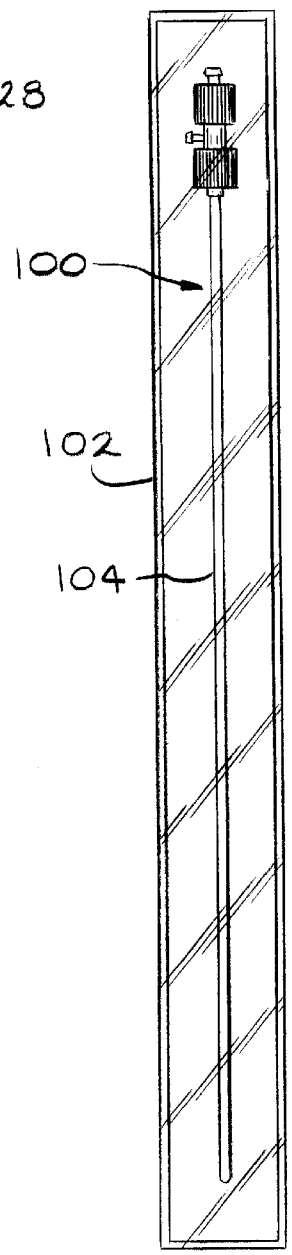
FIG. 10 is a front view of a package containing an assembled disposable needle and hub assembly of the present invention.

In general, the needle and hub assembly is marketed in bulk in either in its assembled form or disassembled into its constituent components. Therefore, in most cases the needle and hub assembly is marketed unsterile. However, the needle and hub assembly can also be marketed assembled and each assembly individually packaged in a package as shown in FIG. 10. The figure shows the assembled needle and hub assembly 100 in package 102. A protective cover 104 is placed over the needle to protect the needle and to prevent the needle from puncturing the package 102. The individually packaged needle and hub assembly can be sterilized.

While the quick disconnect, disposable needle and hub assembly of the present invention is described herein with reference to illustrated embodiments, it should be understood that the present invention is not limited hereto. Those having ordinary skill in the art and access to the teachings herein will recognize additional modifications and embodiments within the scope thereof. Therefore, the present invention is limited only by the claims attached herein.

I claim:

1. A quick disconnect, disposable needle and hub assembly comprising:
    (a) an elongate needle cannula having a proximal end, a distal end, and a sidewall therebetween, the cannula having a lumen therethrough;
    (b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line and wherein the inlet is continuous with the lumen of the needle cannula, and a collar having an array of internal luer lock threads projecting unitarily from the distal end of the hub in spaced concentric relationship about the tip; and
    (c) a fitting including an elongate body having a proximal end, a distal end, and a sidewall therebetween, the elongate body having a cavity therethrough wherein the elongate body having at its distal end a tip projecting therefrom and a collar having an array of internal luer lock threads projecting unitarily from the distal end of the fitting in spaced concentric relationship to the tip, the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the collar at the distal end of the fitting, and the elongate body having an inlet traversing the sidewall connectable to a supply line.

2. The disposable needle and hub assembly of claim 1, including a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting.

3. The disposable needle and hub assembly of claim 1 or 2, wherein the hub and fitting comprise a material that is a polymer.

4. The disposable needle and hub assembly of claim 1 or 2, wherein the fitting comprises a material that is transparent.

5. The disposable needle and hub assembly of claim 1 or 2, wherein the needle is cylindrical.

6. A quick disconnect, disposable needle and hub assembly mounted in an injection apparatus for injecting a material into an egg comprising:

(a) an elongate needle cannula having a proximal end, a distal end, and a sidewall therebetween, the cannula having a lumen therethrough;

(b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line for the material and wherein the inlet is continuous with the lumen of the needle cannula, and a collar having an array of internal luer lock threads projecting unitarily from the distal end of the hub in spaced concentric relationship about the tip;

(c) a fitting including an elongate body having a proximal end, a distal end, and a sidewall therebetween, the elongate body having a cavity therethrough wherein the elongate body having at its distal end a tip projecting therefrom and a collar having an array of internal luer lock threads projecting unitarily from the distal end of the fitting in spaced concentric relationship to the tip, the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the collar at the distal end of the fitting, and the elongate body having an inlet traversing the sidewall connectable to a supply line for introducing a means for sterilizing the needle cannula; and (d) a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting, wherein the second fitting is mounted in the apparatus and the needle cannula is moved with the second fitting to inject the material into the egg.

7. The disposable needle and hub assembly of claim 6, wherein the hub and fitting comprise a material that is a polymer.

8. The disposable needle and hub assembly of claim 6, wherein the fitting comprises a material that is transparent.

9. The disposable needle and hub assembly of claim 6, wherein the needle is cylindrical.

10. In an injection apparatus for injecting a material in an egg, wherein the injection apparatus includes an injection needle mounted in the apparatus for injecting the material into the egg, the improvement is that the injection needle mounted in the apparatus is a quick-disconnect disposable needle and hub assembly comprising:

(a) an elongate needle cannula having a proximal end, a distal end, and a sidewall therebetween, the needle cannula having a lumen therethrough;

(b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line for the material and wherein the inlet is continuous with the lumen of the needle cannula, and a collar having an array of internal luer lock threads projecting unitarily from the distal end of the hub in spaced concentric relationship about the tip;

(c) a fitting including an elongate body having a proximal end, a distal end, and a sidewall therebetween, the elongate body having a cavity therethrough wherein the elongate body having at its distal end a tip projecting therefrom and a collar having an array of internal luer lock threads projecting unitarily from the distal end of the fitting in spaced concentric relationship to the tip, the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the collar at the distal end of the fitting, and the elongate body having an inlet traversing the sidewall connectable to a supply line for introducing a means for sterilizing the needle cannula; and (d) a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting, wherein the second fitting is mounted in the apparatus and the needle cannula is moved with the second fitting to inject the material into the egg.

11. The injection apparatus of claim 10, wherein the hub and fitting comprise a material that is a polymer.

12. The injection apparatus of claim 10, wherein the fitting comprises a material that is transparent.

13. The injection apparatus of claim 10, wherein the needle is cylindrical.

14. A package containing a quick disconnect, disposable needle and hub assembly comprising:

(a) an elongate needle cannula having a proximal end, a distal end, and a sidewall therebetween, the needle cannula having a lumen therethrough;

(b) a hub securely fixed to the proximal end of the needle cannula, the hub including a distal end with a tip projecting therefrom for fixing the proximal end of the needle cannula so that the needle cannula extends away from the distal end of the hub, a proximal end having an inlet projecting therefrom which is connectable to a supply line and wherein the inlet is continuous with the lumen of the needle cannula, and a collar having an array of internal luer lock threads projecting unitarily from the distal end of the hub in spaced concentric relationship about the tip; and (c) a fitting including an elongate body having a proximal end, a distal end, and a sidewall therebetween, the elongate body having a cavity therethrough wherein the elongate body having at its distal end a tip projecting therefrom and a collar having an array of internal luer lock threads projecting unitarily from the distal end of the fitting in spaced concentric relationship to the tip, the elongate body at its proximal end has external luer lock threads which engage the internal luer lock threads of the collar of the hub to form a seal between the side wall of the fitting and the tip of the hub so that the distal end of the needle cannula extends through the cavity of the elongate body parallel to the sidewall and extends away from the collar at the distal end of the fitting, and the elongate body having an inlet traversing the sidewall connectable to a supply line.

15. The package of claim 14, including a second fitting wherein the second fitting has an elongate body having a proximal end, a distal end, and a sidewall therebetween, the elongate body of the second fitting having a cavity therethrough wherein the elongate body of the second fitting at its proximal end has external luer lock threads which engage the internal luer lock threads of the collar of the fitting to form a seal between the side wall of the second fitting and the tip of the fitting, wherein the cavity of the second fitting is continuous with the cavity of the fitting, and wherein the distal end of the needle cannula extends through the cavity of the elongate body of the second fitting parallel to the sidewall and extends away from the distal end of the second fitting.

16. The package of claim 14 or 15, wherein the hub and fitting comprise a material that is a polymer.

17. The package of claim 14 or 15, wherein the fitting comprises a material that is transparent.

18. The package of claim 14 or 15, wherein the needle is cylindrical.

* * * * *